United States Patent Office 3,562,251
Patented Feb. 9, 1971

3,562,251
CERTAIN 2,3-DIHYDRO-1,4-BENZODIAZEPINE-3-CARBOXAMIDE DERIVATIVES
Rodney Ian Fryer, North Caldwell, and Leo Henryk Sternbach, Upper Montclair, N.J., assignors to Hoffmann-La Roche Inc., Nutley, N.J., a corporation of New Jersey
No Drawing. Filed Apr. 11, 1967, Ser. No. 629,921
Int. Cl. C07d 53/06
U.S. Cl. 260—239                                         4 Claims

ABSTRACT OF THE DISCLOSURE 2,3 - dihydro - 3 - (N - substituted - carbamoyl) - 7-nitro-1,4-benzodiazepines which are useful as anticonvulsants and a process for their preparation from 2,3-dihydro - 7 - nitro - 1,4 - bendodiazepin - 2 - ones by means of transamidation with ammonia and amino compounds. Also included are intermediates in this process.

BACKGROUND OF INVENTION

This invention is directed to novel 2,3-dihydro-1,4-benzodiazepine derivatives and a method for their preparation. More particularly, this invention relates to 2,3 - dihydro - 7 - nitro - 1,4 - benzodiazepine derivatives which have an N-substituted carbamoyl group in the 3 position and a method for preparing these benzodiazepine derivatives.

SUMMARY OF THE INVENTION

The novel 2,3-dihydro-1,4-benzodiazepine derivatives of this invention are compounds of the formula:

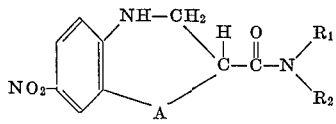

I wherein A is selected from the group consisting of

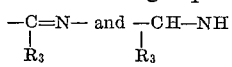 and 

$R_1$ is selected from the group consisting of hydrogen, $$-N-R_4,$$
$$\quad |$$
$$\quad R_5$$

lower alkyl and —OH; $R_2$ is selected from the group consisting of lower alkyl, and hydrogen; and $R_1$ and $R_2$ taken together with their attached nitrogen atom form a five or six membered heterocyclic ring; $R_3$ is selected from the group consisting of phenyl, lower alkyl substituted phenyl, halo substituted phenyl and pyridyl and $R_4$ and $R_5$ are selected from the group consisting of hydrogen, and lower alkyl and $R_4$ and $R_5$ taken together form lower alkylidene, and their pharmaceutically acceptable salts.

The compounds of Formula I above form pharmaceutically acceptable acid addition salts with both inorganic and organic pharmaceutically acceptable acids such as hydrochloric acid, hydrobromic acid, sulfuric acid, phosphoric acid, citric acid, acetic acid, succinic acid, maleic acid, methane sulfonic acid, p-toluene-sulfonic acid and the like. Such acid addition salts are also within the scope of the invention.

The compounds of Formula I above can be prepared from 2,3-dihydro-1,4-benzodiazepin-2-one compounds of the formula:

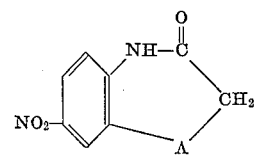

II wherein A is as above, by first treating the compound of Formula II above with an amino compound of the formula:

III wherein $R_1$ and $R_2$ are as above, to split the 1,2-dihydro-1,4-benzodiazepin-2-one ring between the nitrogen at the 1-position and the carbonyl group at the 2-position, forming a transamidated product of the formula:

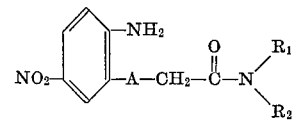

IV wherein $R_1$ and $R_2$ are as above, and A is as above.

The transamidated product is then reacted with a formylating agent to form a compound of the formula:

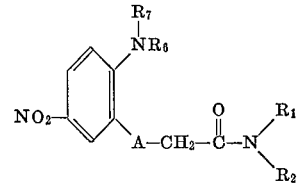

V wherein A, $R_1$ and $R_2$ are as above and $R_6$ is

$R_7$ is hydrogen and $R_6$ and $R_7$ being taken together to form

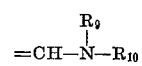

and $R_8$ is hydrogen or lower alkyl and $R_9$ and $R_{10}$ are lower alkyl.

The formulated product is then cyclized to produce a 3-(N-substituted-carbamoyl) - 1,4 - benzodiazepine of the formula:

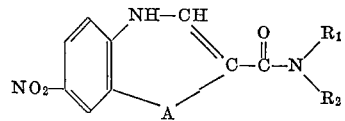

VI

The compound of Formula VI above is converted to the compound of Formula I by treating the compound of Formula VI above with sodium borohydride or any conventional reducing agent.

The compounds of Formula I above, are useful as anticonvulsants. The compounds of Formula I above, as well as their pharmaceutically acceptable acid addition salts are used in the form of conventional pharmaceutical preparations which contain said compounds in connection with conventional pharmaceutical organic or inorganic carrier materials suitable for internal administration. The pharmaceutical compositions containing the compounds of Formula I above as well as their pharmaceutically acceptable acid addition salts, can be administered parenterally or orally, dosages can be adjusted to individual requirements, for example these compounds can be administered in dosages of from about 0.1 mg./kg. to about 10.0 mg./kg. per day. These dosages can be administered in single dosage form or in divided dosage forms. The pharmaceutical compositions can contain such conventional organic or inorganic inert carrier materials such as water, gelatin, lactose, starch, magnesium stearate, talc, vegetable oils, gums, polyalkylene glycose, Vaseline or the like. The pharmaceutical preparations can be in the conventional solid forms such as tablets, dragées, suppositories, capsules or in conventional liquid form such as solutions, suspensions or emulsions. The pharmaceutical compositions can be submitted to conventional pharmaceutical expedients such as sterilization and/or can contain conventional pharmaceutical additives such as preservatives, stabilizing agents, wetting agents, emulsifying agents, salts for adjusting the osmotic pressure, buffers or the like. They can also contain other therapeutically useful materials.

DETAILED DESCRIPTION OF THE INVENTION

As used throughout the specification, the term, lower alkyl includes both straight and branched chain alkyl groups having from 1 to 7 carbon atoms, such as methyl, ethyl, propyl, isopropyl and the like. The term "lower alkylidene" includes both straight and branched chain alkylidene groups having from 1 to 7 carbon atoms such as methylidene, ethylidene, isopropylidene, etc. The term, halogen, includes all four halogens, i.e., iodine, bromine, chlorine and fluorine, with chlorine, fluorine and bromine being the preferred halogens.

The preferred 2,3-dihydro-1,4-benzodiazepin-2-ones of Formula II above which are utilized as the starting material in the reactions of this invention are those 2,3-dihydro - 1,4 - benzodiazepin-2-ones wherein $R_3$ is either phenyl, 2-pyridyl or phenyl-substituted on the 2-position with a halo group such as chlorine or fluorine.

The 1,2-dihydro-1,4-benzodiazepin-2-one compound of Formula II above, are converted to the transamidated products of Formula IV above by treating the compounds of Formula II with an amino compound of Formula III above. This reaction can be carried out at room temperature. However, it is preferred to carry out this at elevated temperatures either using the amino compound as solvent or in the presence of an inert organic solvent. Any conventional inert organic solvent can be utilized in carrying out this reaction. Typical inert organic solvents which can be utilized in accordance with this invention include diethyl ether, tetrahydrofuran, benzene, hexane, pentane, ethyl propyl ether and mixtures thereof. However, the preferred organic solvents are dimethylformamide and dimethylsulfoxide. In carrying out this reaction, it is generally preferred to utilize temperatures of from about 20° C. to about 175° C.

By means of this reaction, the ring of the 1,2-dihydro-1,4-benzodiazepin-2-one of Formula II above is split at the 1–2 position so that transamidation occurs to produce the compounds of Formula IV above. This reaction is completely unexpected since it has been found that no substantial splitting with the resultant transamidation occurs if the 2,3-dihydro-1,4-benzodiazepin-2-one which is utilized as a starting material contains functional groups other than nitro at the 7-position. Hence, it has been discovered that when 7-nitro-2,3-dihydro-1,4-benzodiazepin-2-one is reacted with an amino compound having at least one reactive hydrogen, splitting of the benzodiazepin-2-one ring occurs at the 1–2 position with the resultant transamidation.

The preferred organic amino compounds of Formula III above which are utilized in carrying out this reaction are ammonia; primary amines such as methyl amine, ethylamine, isopropyl amine, propyl amine, butyl amine, etc.; hydrazine and lower alkyl substituted hydrazines such as methyl hydrazine, ethyl hydrazine, isopropyl hydrazine; and secondary amines. Among the preferred secondary amines which can be utilized in accordance with this invention such as the lower alkyl amines which include diethyl amine, dimethyl amine, N,N-propyl butyl amine, N,N-methylethyl amine, etc. and the heterocyclic amines such as pyrrolidine and piperidine.

The transamidated compound of Formula IV above is converted to the compound of Formula V above by means of reacting the compound of Formula IV above with a formylating agent. In carrying out this reaction, any conventional formylating agent can be utilized to formylate the primary amino group in the compound of Formula IV above. Among the formylating agents that are utilized in accordance with this invention are formic anhydride, which is formed by placing formic acid in acetic anhydride, mono or di-lower alkyl substituted amides of formic acid or an acetal of formic amide. Typical formylating agents include dimethylformamide acetal, dimethylformamide with thionyl chloride, and formic anhydride. Generally, it is preferred to carry out this reaction using the formylating agent as the solvent or in the presence of an inert organic solvent. In carrying out this reaction, it is best not to exceed a temperature of over 40° C. since the formation of undesirable by-products occurs at high temperatures. Furthermore, it is generally preferred to utilize temperatures fom about 10° C. to about 40° C. Any of the conventional inert organic solvents such as those hereinbefore mentioned can be utilized in carrying out this reaction.

In cyclizing the formylated compound of Formula V above to form the 3-(N-substituted carbamoyl)-1,4-benzodiazepine of Formula VI above, the compound of Formula V above is heated in the presence of an inert organic solvent. In carrying out this cyclization reaction, temperatures of from about 65° C. to 130° C. should be utilized. This cyclization reaction can be carried out in an inert organic solvent such as any of the hereinbefore mentioned organic solvents. The preferred solvents for utilization in this cyclization reaction are xylene, toluene and benzene.

The 3-(N-substituted carbamoyl)-1,4-benzodiazepines of Formula VI above can be converted to the 2,3-dihydro-3-(N-substituted carbamoyl)-1,4-benzodiazepines of Formula I above by means of treating the compounds of Formula VI above with sodium borohydride or other conventional reducing agents in the presence of an inert organic solvent. Any of the aforementioned inert organic solvents can be utilized in carrying out this reaction. Generally, it is preferred to use ethanol, chloroform or mixtures thereof in carrying out this reaction. In carrying out this reaction, temperature and pressure are not critical and the reaction can be carried out at room temperature or elevated temperatures. Generally, it is preferred to utilize temperatures ranging from 70° C. to the reflux temperature of the solvents.

The following examples are illustrative but not limitative of the present invention. In the examples, the temperature is given in degrees centigrade and the ether utilized was diethyl ether.

EXAMPLE 1

This example is directed to the preparation of 2,3-dihydro-3-(N-methyl)carbamoyl-7-nitro - 5 - phenyl-1H-1,4-benzodiazepine.

(A) Transamidation

A stream of methylamine gas was bubbled into a solution of 10 g. of 1,3-dihydro-7-nitro-2H-1,4-benzodiazepin-2-one in 100 ml. of N,N-dimethylformamide at room temperature. After 30 min. the addition of methylamine was stopped and the reaction mixture was allowed to stand overnight. Solvent was removed under reduced pressure and the residue was treated first with 10 ml. of methanol and then with 100 ml. of ether. The product was filtered and recrystallized from ethanol to give 2-[(2-amino-5-nitrophenyl)phenylmethylenimino] - N - methylacetamide.

(B) Formylation

A flask fitted with a stirrer and dropping funnel was externally cooled with an ice bath. 94 percent formic acid (13.6 ml.) was added and cooled (0–5°). Acetic anhydride (32.8 ml.) was added dropwise and after the addition was complete the reaction mixture was warmed to 50° and maintained at that temperature for 2 hrs. The solution was next cooled to 0° and 15 g. of 2-[(2-amino-5-nitrophenyl)phenylmethylenimino] - N - methylacetamide was added with stirring.

The mixture was allowed to warm to room temperature, stirred for 2 hrs. and then poured into 500 ml. of water. The aqueous mixture was made basic with ammonium hydroxide and filtered. The precipitate was washed with water then with ethanol and finally with ether to give 2-[(2-formamido-5-nitrophenyl)phenylmethylenimino]-N-methylacetamide as pale yellow rods.

(C) Cyclization

A solution of 1 g. of 2-[(2-formamido-5-nitrophenyl)phenylmethylenimino]-N-methylacetamide in 50 ml. of dry toluene was heated under reflux for 7 hrs. Solvents were evaporated and the residue was crystallized from a mixture of methanol and ether to give N-methyl-7-nitro-5-phenyl-1H-1,4-benzodiazepine-3-carboxamide.

(D) Reduction

A mixture of 3.7 g. (0.0114 m.) of N-methyl-7-nitro-5-phenyl-1H-1,4-benzodiazepine-3-carboxamide 3.46 g. (0.09 m.) of sodium borohydride, 50 ml. of chloroform and 200 ml. of absolute ethanol was heated under reflux for 13 hrs. Water (200 ml.) was added and the mixture was filtered. The precipitate was triturated with water and dichloromethane and filtered. A precipitate was retained. The filtrate was placed in a separatory funnel and the layers were separated. The organic layer was washed, dried and evaporated to give crude product. The original filtrates were extracted with dichloromethane. The organic layers were combined, washed, dried and evaporated to give a residue. Recrystallization of this residue from methanol gave crude product. The three fractions of crude product were slurried in 50 ml. of ethanol dissolved in 250 ml. of 3 N hydrochloric acid, which was then made basic with ammonium hydroxide and filtered. Recrystallization of the residue from a mixture of chloroform and ethanol gave 2,3-dihydro-3-(N-methyl)carbamoyl-7-nitro-5-phenyl-1H-1,4-benzodiazepine.

EXAMPLE 2

This example is directed to the preparation of 2,3-dihydro - 3 - (N-methyl)carbamoyl - 7 - nitro-5-phenyl-1H-1,4-benzodiazepine according to another embodiment of this invention.

(A) Formylation

A solution of 70 g. of 2 - [(2-amino-5-nitrophenyl)phenylmethylenimino] - N - methylacetamide in 375 ml. of N,N-dimethylformamide acetal was stirred at room temperature for 6 days. The precipitated product was obtained by filtration and was washed with ether to give 2-[(dimethylaminomethylenimino - 5 - nitrophenyl)phenylmethyleneimino]-N-methylacetamide as yellow prisms.

(B) Cyclization

A solution of 57 g. of 2-[(dimethylaminomethylenimino - 5 - nitrophenyl)phenylmethyleneimino] - N-methylacetamide in 500 ml. of toluene was heated under reflux for 72 hr., cooled slightly and filtered. The precipitate, was washed with ether and dried to give N-methyl-7 - nitro-5-phenyl-1H-1,4-benzodiazepine-3-carboxamide as dark red prisms.

(C) Reduction

A mixture of 3.7 g. (0.0114 m.) of N-methyl-7-nitro-5 - phenyl - 1H - 1,4 - benzodiazepine - 3 - carboxamide 3.46 g. (0.09 m.) of sodium borohydride, 50 ml. of chloroform and 200 ml. of absolute ethanol was heated under reflux for 13 hr. Water (200 ml.) was added and the mixture was filtered. The precipitate was triturated with water and dichloromethane and filtered. A precipitate was retained. The filtrate was placed in a separatory funnel and the layers were separated. The organic layer was washed, dried and evaporated to give crude product. The original filtrates were extracted with dichloromethane. The organic layers were combined, washed, dried and evaporated to give a residue. Recrystallization of this residue from methanol gave crude product. The three fractions of crude product were slurried in 50 ml. of ethanol dissolved in 250 ml. of 3 N hydrochloric acid, which was then made basic with ammonium hydroxide and filtered. Recrystallization of the residue from a mixture of chloroform and ethanol gave, 2,3 - dihydro - 3 - (N-methyl)carbamoyl-7-nitro-5-phenyl-1H-1,4-benzodiazepine.

EXAMPLE 3

This example is directed to the preparation of 1-{2-[(2-amino - 5-nitrophenyl)phenylmethylenimino]acetyl} pyrrolidine.

A solution of 10 g. of 1,3-dihydro-7-nitro-5-phenyl-2H-1,4-benzodiazepin-2-one in 50 ml. of pyrrolidine was heated under reflux for 1 hr. The mixture was cooled and filtered to give 1 - {2-[(2-amino-5-nitrophenyl)phenylmethylenimino]acetyl} pyrrolidine as bright yellow prisms. Recrystallization from 2-ethoxyethanol gave the pure material.

1 - {2 - [(2-amino-5-nitrophenyl)phenylmethylenimino] acetyl} pyrrolidine was formylated, cyclized and reduced by the same process given in parts B, C, and D of Example 1 to give 2,3-dihydro-3-pyrrolidinyl carbonyl-7-nitro-5-phenyl-1H-1,4-benzodiazepine.

EXAMPLE 4

This example is directed to the preparation of 2-[(2-amino - 5 - nitrophenyl) phenylmethylenimino] - N-butylacetamide.

A solution of 10 g. of 1,3 - dihydro - 7 - nitro-5-phenyl - 2H - 1,4-benzodiazepin-2-one in 50 ml. of n-butylamine was heated under reflux for 2 hr. The solution was evaporated under reduced pressure and the residue was crystallized from methanol to give 2-[(2-amino-5-nitrophenyl)phenylmethylenimino]-N-butylacetamide as yellow prisms.

2 - [(2 - amino - 5 - nitrophenyl)phenylmethylenimino]-N-butylacetamide was formylated, cyclized and reduced by the same process given in parts B, C, and D of Example 1 to give 2,3-dihydro-3(-N-butyl) carbamoyl-7-nitro - 5 - phenyl - 1H-1,4-benzodiazepine.

EXAMPLE 5

(A) Preparation of 1-{2-[(2-amino-5-nitrophenyl)-(2-chlorophenyl)methylenimino]acetyl} piperidine A solution of 9.5 g. of 5-(2-chlorophenyl)1,3-dihydro-7-nitro-5-phenyl-2H-1,4-benzodiazepin-2-one in 50 ml. of piperidine was heated under reflux for 1 hr. The solution was poured into 1 l. of water which was then made acidic (pH 4) with hydrochloric acid. The mixture was extracted with dichloromethane (3× 150 ml.). The organic layers were combined, washed with 1 N hydrochloric acid (1× 100 ml.), water (3× 100 ml.), brine (1× 100 ml.), dried over anhydrous sodium sulfate, filtered and evaporated. Recrystallization of the residue from ethanol gave 1-{2-[(2 - amino - 5-nitrophenyl)-(2-chlorophenyl)methylenimino]acetyl} piperidine as pale yellow prisms.

(B) Preparation of 1{2-[(2-acetamido-5-nitrophenyl)-(2-chlorophenyl)-methylenimino]acetyl} piperidine A mixture of 1 g. of 1-{2-[(2-amino-5-nitrophenyl)-(2 - chlorophenyl)methylenimino]acetyl} piperidine; 25 ml. of acetic anhydride and 2.5 g. of sodium acetate was heated on the steam bath for 1 hr. and then allowed to stand at room temperature for 2 days. The mixture was poured into ice and water (300 ml.) which was made basic (NH₄OH) and the product was extracted into dichloromethane (3× 50 ml.). The organic layers were combined, washed with water, dried, filtered and evaporated. Recrystallization of the residue from a mixture of benzene and hexane gave 1{2-[(2-acetamido-5-nitrophenyl) - (2 - chlorophenyl)-methylenimino]acetyl} piperidine.

1 - {2 - [(2 - amino - 5 - nitrophenyl) - (2-chlorophenyl) methylenimino]acetyl} piperidine was cyclized and reduced by the same process as given in parts C and D of Example 1 to give 2,3-dihydro-3-piperidine-carbonyl-7-nitro-5-phenyl-1H-1,4-benzodiazepine.

EXAMPLE 6

(A) Preparation of 1-{2[(2-aminophenyl-5-nitrophenyl) phenylmethylenimino]acetyl} piperidnie A solution of 10 g. of 1,3-dihydro-7-nitro-2H-1,4-benzodiazepin-2-one in 50 ml. of piperidine was heated under reflux for 1 hr. A total of 35 ml. of piperidine was removed by distillation and the residue was poured into 50 ml. of methanol. The solution was cooled and the product collected by filtration. Recrystallization of the product from a mixture of chloroform and ethanol gave 1-{2[(2-aminophenyl - 5 - nitrophenyl)phenylmethylenimino]acetyl}piperidine as yellow prisms.

(B) Preparation of 1-{2-[(2-acetamido-5-nitrophenyl) phenylmethylenimino]acetyl} piperidine A mixture of 5 g. of 1-{2[(2-aminophenyl-5-nitrophenyl)phenylmethylenimino]acetyl} piperidine, 25 ml. of acetic anhydride and 2.5 g. of sodium acetate was warmed on a steam bath for 3 hr. and then allowed to stand at room temperature for 2 days. The reaction mixture was poured into a mixture of ice and water which was then made basic with ammonium hydroxide. The mixture was extracted with dichloromethane (3× 100 ml.). The organic layers were combined, washed with water (3× 50 ml.), brine (1× 100 ml.), dried over anhydrous sodium sulfate, filtered and evaporated. The residue was recrystallized from a mixture of benzene and hexane to give 1-{2-[(2-acetamido - 5 - nitrophenyl)phenylmethylenimino]acetyl} piperidine as pale yellow prisms.

1-{2-[(2-acetamido - 5 - nitrophenyl)phenylmethylenimino]acetyl} piperidine was cyclized and reduced by the same process given in parts C and D of Example 1 to give 2,3-dihydro - 2 - methyl-3-piperidino-carbonyl-7-nitro-5-phenyl-1H-1,4-benzodiazepine.

EXAMPLE 7

(A) Transamidation

To a stirred mixture of 26.5 g. (0.1 mole) of 1,3-dihydro-7-nitro-5-phenyl-2H-1,4-benzodiazepin-2-one and 250 ml. of ethanol, 100 ml. of hydrazine hydrate was added at room temperature. The solid dissolved with evolution of heat giving a yellow solution and the immediate formation of a crystalline yellow compound. Recrystallization from DMF/H₂O gave N-(2-amino-5-nitro-α-phenylbenzylidene)glycine hydrazide.

(B) Acylation of the hydrazide

A solution of 7.0 g. (22.4 mole) of N-(2-amino-5-nitro-α-phenylbenzylidene)glycine isopropylidene hydrazide was dissolved in 100 ml. of acetone and allowed to reflux 48 hr. Upon cooling, 0.9 g. of starting material was removed by filtration and the solvent was removed from the filtrate giving a crude solid. Recrystallization from acetone-hexane gave N-(2-amino-5-nitro-α-phenylbenzylidene)-glycine isopropylidenehydrazide as yellow prisms.

N-(2-amino-5-nitro-α-phenylbenzylidene) - glycine isopropylidenehydrazide was formylated cyclized and reduced by the same process given in parts B, C, and D of Example 1 to give 2,3-dihydro-7-nitro-1H-1,4-benzodiazepine-3-carboxylic acid-N-2-isopropylidene hydrazide.

EXAMPLE 8

A mixture of 26.5 g. (0.1 mole) of 1,3-dihydro-7-nitro-5-phenyl-2H-1,4-benzodiazepin-2-one and 300 ml. of ethanol was stirred during the addition of 55 ml. of methylhydrazine. The starting material disolved giving a yellow-orange solution. Removal in vacuo of the solvents left an orange gum from which N-(2-amino-5-nitro-α-phenylbenzylidene)glycine-2-methyl hydrazide was obtained by crystallization from chloroform hexane.

N-(2-amino - 5 - nitro-α-phenylbenzylidene)glycine-2-methyl hydrazide was formylated, cyclized and reduced by the same process given in parts B, C, and D of Example 1 to give 2,3-dihydro-7-nitro-1H-1,4-benzodiazepine-3-carboxylic acid-N-2-methyl hydrazide.

EXAMPLE 9

A mixture of 26.5 g. (0.1 mole) of 1,3-dihydro-7-nitro-5-phenyl-2H-1,4-benzodiazepin-2-one and 0.5 mole of hydroxylamine in 500 ml. of ethanol was stirred 48 hr. at room temperature. Filtration afforded pale yellow solid 2-(2-amino - 5 - nitro-α-phenylbenzylideneimino) acetohydroxamic acid.

2-(2-amino-5-nitro - α - phenylbenzylideneimino)acetohydroxamic acid was formylated, cyclized and reduced by the same process given in parts B, C, and D of Example 1 to give 2,3-dihydro-3-hydroxamic acid-7-nitro-5-phenyl-1H-1,4-benzodiazepine.

EXAMPLE 10

This example is directed to the preparation of 2-[1-(2-amino - 5 - nitrophenyl) - 1 - phenylmethylene imino] acetamide.

A mixture of 10 g. of 1,3-dihydro-7-nitro-5-phenyl-2H-1,4-benzodiazepin-2-one, 70 ml. of conc. ammonium hydroxide and 250 ml. of N,N-dimethyl-formamide was stored in a closed flask at room temperature for 24 hours. The mixture was distilled under reduced pressure and the residue treated twice with 70 ml. of benzene and the solvent distilled each time. The yellowish solid thus obtained was resuspended in 100 ml. of benzene and filtered to give 2-[1-(2-amino - 5 - nitro-phenyl)-1-phenylmethylene imino]acetamide.

2-[1-(2-amino-5-nitrophenyl) - 1 - phenylmethylene imino]acetamide was formylated, cyclized and reduced in the same procedure given in parts B, C and D of Example 1 to give 2,3-dihydro-3-carbamoyl-7-nitro-5-phenyl-1H-1,4-benzodiazepine.

EXAMPLE 11

This example is directed to the preparation of 2-[(2-amino-5-nitrophenyl) (2 - chlorophenyl)methyleneimino] acetamide.

A mixture of 35 g. of 5-(2-chlorophenyl)1,3 - dihydro-7-nitro - 5 - phenyl-2H-1,4-benzodiazepin-2-one, 300 ml. of conc. ammonium hydroxide and 1 liter of N,N-dimethylformamide was stored in a closed flask at room temperature for 24 hours. The mixture was distilled under reduced pressure and the residue treated twice with 150 ml. of benzene and the solvent distilled each time. The yellowish solid thus obtained was resuspended in 250 ml. of benzene and filtered to give 2-[(2-amino-5-nitrophenyl) (2-chlorophenyl)methyleneimino]acetamide.

2-[(2-amino-5 - nitrophenyl)(2 - chlorophenyl)methyleneimino] acetamide was formylated, cyclized and reduced in the same manner given in parts B, C, and D of Example 1 to give 2,3 - dihydro-3-carbamoyl-7-nitro-5-(2'-chlorophenyl)-1H-1,4-benzodiazepine.

EXAMPLE 12

A tablet formulation was prepared containing the following ingredients:

| Ingredient: | Amount per tablet, mg. |
|---|---|
| 2,3 - dihydro-3-(N-methyl)carbamoyl-7-nitro-5-phenyl - 1H - 1,4-benzodiazepine | 10.0 |
| Lactose | 129.0 |
| Corn starch | 50.0 |
| Pregelatinized corn starch | 8.0 |
| Calcium stearate | 3.0 |
| Total weight | 200.0 |

The procedure in preparing a 200 mg. tablet was as follows:

2,3-dihydro - 3-(N-methyl)carbamoyl-7-nitro-5-phenyl-1H-1,4-benzodiazepine, lactose, corn starch and pregelatinized corn starch were mixed in a suitable mixer. The mix was passed through a Fitzpatrick Comminuting Machine fitted with No. 1A screen and with knives forward. The mixture was returned to the mixer and moistened with water to a thick paste. The moist mass was passed through a No. 12 screen, and the moist granules were dried on paper lined trays at 110° F. The dried granules were returned to the mixer, and the calcium stearate was added and mixed well. The granules were compressed at a tablet weight of 200 mg. using standard concave punches having a diameter of $5/16''$.

EXAMPLE 13

A tablet was prepared containing the following ingredients:

| Ingredient: | Amount per tablet, mg. |
|---|---|
| 2,3 - dihydro-3-(N-methyl)carbamoyl-7-nitro-5-phenyl-1H-1,4-benzodiazepine | 25.00 |
| Lactose, U.S.P. | 64.50 |
| Corn starch | 10.00 |
| Magnesium stearate | 0.50 |

The procedure employed in preparing a single tablet was as follows:

2,3-dihydro-3-(N-methyl)carbamoyl-7-nitro - 5-phenyl-1H-1,4-benzodiazepine was mixed with lactose, corn starch and magnesium stearate in a suitable mixer. The mixture was further blended by passing through a Fitzpatrick Comminuting Machine fitted with a No. 1A screen with knives forward. The mixed powders were slugged on a tablet compressing machine. The slugs were comminuted to a suitable mesh size (No. 16 screen) and mixed well. The tablets were compressed at a tablet weight of 100 mg. using tablet punches having a diameter of approximately $1/4''$.

EXAMPLE 14

A 320 mg. tablet was prepared containing the following ingredients:

| Ingredient: | Amount per tablet, mg. |
|---|---|
| 2,3 - dihydro - 3-(N-methyl)carbamoyl-7-nitro-5-phenyl-1H-1,4-benzodiazepine | 100 |
| Dicalcium phosphate | 60 |
| Corn starch | 157 |
| Maganesium stearate | 3 |
| Total weight | 320 |

The procedure employed in preparing a 320 mg. tablet was as follows:

2,3-dihydro-3-(N-methyl)carbamoyl-7-nitro-5 - phenyl-1H-1,4-benzodiazepine was mixed with the dicalcium phosphate, corn starch and magnesium stearate in a suitable mixer. The mixture was further blended by passing through a Fitzpatrick Comminuting Machine fitted with a No. 1A screen with knives forward. The mixed powders were slugged on a tablet compressing machine. The slugs were comminuted to a suitable mesh size (No. 16 screen) and mixed well. The tablets were compressed at a table weight of 320 mg. using tablet punches having a diameter of $3/8''$ (flat beveled faced punched).

EXAMPLE 15

A capsule formulation was prepared containing the following ingredients:

| Ingredient: | Amount per capsule, mg. |
|---|---|
| 2,3 - dihydro - 3-(N-methyl)carbamoyl-7-nitro-5-phenyl-1H-1,4-benzodiazepine | 50 |
| Lactose, U.S.P. | 125 |
| Corn starch, U.S.P. | 30 |
| Talc, U.S.P. | 5 |
| Total weight | 210 |

The procedure employed in preparing a 210 mg. tablet was as follows:

2,3 - dihydro-3-(N-methyl)carbamoyl-7-nitro-5-phenyl-1H-1,4-benzodiazepine was mixed with lactose and corn starch in a suitable mixer. The mixture was further blended by passing through a Fitzpatrick Comminuting Machine with a No. 1A screen with knives forward. The blended powder was returned to the mixer, the talc added and blended thoroughly. The mixture was filled into No. 4 hard shell gelatin capsules on a Parke Davis capsulating machine.

EXAMPLE 16

A capsule formulation was prepared containing the following ingredients:

| Ingredient: | Amount per capsule, mg. |
|---|---|
| 2,3-dihydro-3-(N-methyl)carbamoyl-7-nitro-5-phenyl-1H-1,4-benzodiazepine | 25.5 |
| Lactose | 159.5 |
| Corn starch | 30.0 |
| Talc | 5.0 |
| Total net weight | 220.0 |

The procedure employed in preparing a capsule formulation was as follows:

2,3 - dihydro - 3 - (N - methyl)carbamoyl - 7 - nitro-5-phenyl-1H-1,4-benzodiazepine, lactose and corn starch were mixed in a suitable mixer. The mixture was passed through a Fitzpatrick Comminuting Machine using a No. 1A screen and knives forward. The mixture was returned to the mixer and the talc added. It was blended well and filled into No. 4 two piece, hard gelatin capsules on a Parke Davis capsulating machine. (Any similar type capsulating machine may be used.)

EXAMPLE 17

A suppository formulation was prepared containing the following ingredients:

| Ingredient: | Gram per 1.3 gm. Suppository |
|---|---|
| 2,3-dihydro-3-(N-methyl)carbamoyl-7-nitro-5-phenyl-1H-1,4-benzodiazepine | 0.050 |
| Wecobee M[1] | 1.205 |
| Carnauba Wax | 0.045 |

[1] Cocoa butter-coconut derived fat having a melting point of 96° F. to 98° F. sold by E. F. Drew Co., New York, N.Y.

The procedure employed in preparing a suppository formulation was as follows:

The Wecobee and the carnauba wax were melted in a suitable size glass lined container, mixed well and cooled to 45° C. 2,3-dihydro-3-(N-methyl)carbamoyl-7-nitro-5-phenyl-1H-1,4-benzodiazepine, which had been reduced to a fine powder with no lumps, was added and stirred until completely and uniformly dispersed. The mixture was poured into suppository molds to yield suppositories having an individual weight of 1.3 gms. The suppositories were removed from molds and cooled. They were individually wrapped in wax paper for packaging.

EXAMPLE 18

A parenteral formulation was prepared containing the following ingredients:

| Ingredient: | Amount per ml. |
|---|---|
| 2,3 - dihydro-3-(N-methyl)carbamoyl-7-nitro-5-phenyl - 1H-1,4-benzodiazepine ....mg.. | 5.0 |
| Propylene glycol ..................ml.. | 0.5 |
| Benzyl alcohol (benzaldehyde free) ....ml.. | 0.015 |
| Ethanol 95% U.S.P. ...............ml.. | 0.10 |
| Water for injection q.s. ...........ml.. | 1 |

The procedure employed in preparing a parenteral formulation was as follows:

The 50 grams of 2,3-dihydro-3-(N-methyl)carbamoyl-7-nitro-5-phenyl-1H-1,4-benzodiazepine were dissolved in a mixture of 150 ml. of benzyl alcohol, 5000 ml. of propylene glycol and 1000 ml. of ethanol. The solution was brought up to final volume of 10,000 ml. with Water for Injection. The solution was filtered through an 02 Selas candle, filled into suitable size ampuls, gassed with nitrogen and sealed. It was then autoclaved at 10 p.s.i. for 30 minutes.

We claim:

1. A compound of the formula:

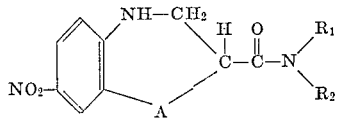

wherein A is selected from the group consisting of

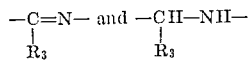

$R_1$ is selected from the group consisting of hydrogen,

lower alkyl and —OH; $R_2$ is selected from the group consisting of lower alkyl, and hydrogen; and $R_1$ and $R_2$ taken together with their attached nitrogen atom form a five or six membered heterocyclic ring selected from the group consisting of pyrrolidino and piperidino; $R_3$ is selected from the group consisting of phenyl, lower alkyl substituted phenyl, halo substituted phenyl and pyridyl and $R_4$ and $R_5$ are selected from the group consisting of hydrogen, and lower alkyl and $R_4$ and $R_5$ taken together form lower alkylidene.

2. The compound of claim 1 wherein said compound is 2,3 - dihydro - 3 - (N - methyl) - carbamoyl - 7 - nitro-5-phenyl-1H-1,4-benzodiazepine.

3. A compound of the formula

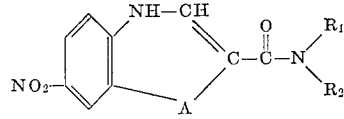

wherein A is selected from the group consisting of

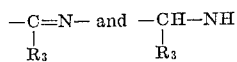

$R_1$ is selected from the group consisting of hydrogen,

lower alkyl and —OH; $R_2$ is selected from the group consisting of lower alkyl, and hydrogen; and $R_1$ and $R_2$ taken together with their attached nitrogen atom form a five or six membered heterocyclic ring selected from the group consisting of pyrrolidino and piperidino; $R_3$ is selected from the group consisting of phenyl, lower alkyl substituted phenyl, halo substituted phenyl and pyridyl and $R_4$ and $R_5$ are selected from the group consisting of hydrogen, and lower alkyl and $R_4$ and $R_5$ taken together form lower alkylidene.

4. The compound of claim 3 wherein said compound is N-methyl-7-nitro-5-phenyl-1H-1,4-benzodiazepine-3-carboxamide.

References Cited

Adkins: Reactions of Hydrogen (Wisconsin, 1937), p. 128.

Chemical Abstracts, vol. 64, cols. 15902–15904 (1966).

ALTON D. ROLLINS, Primary Examiner

U.S. Cl. X.R.

260—293.4, 294.7, 294.8, 295, 326.5, 558; 424—244, 263, 267, 274